(12) United States Patent
Ogura et al.

(10) Patent No.: US 9,108,187 B2
(45) Date of Patent: Aug. 18, 2015

(54) FE(II)-SUBSTITUTED BETA TYPE ZEOLITE, GAS ADSORBENT CONTAINING SAME AND METHOD FOR PRODUCING SAME, AND METHOD FOR REMOVING NITROGEN MONOXIDE AND HYDROCARBON

(75) Inventors: Masaru Ogura, Tokyo (JP); Keiji Itabashi, Tokyo (JP); Tatsuya Okubo, Tokyo (JP); Shanmugam Palani Elangovan, Tokyo (JP)

(73) Assignees: UNIZEO CO., LTD., Tokyo (JP); THE UNIVERSITY OF TOKYO, Tokyo (JP)

( * ) Notice: Subject to any disclaimer, the term of this patent is extended or adjusted under 35 U.S.C. 154(b) by 136 days.

(21) Appl. No.: 13/979,670

(22) PCT Filed: Jan. 17, 2012

(86) PCT No.: PCT/JP2012/050778
§ 371 (c)(1),
(2), (4) Date: Sep. 10, 2013

(87) PCT Pub. No.: WO2012/099090
PCT Pub. Date: Jul. 26, 2012

(65) Prior Publication Data
US 2014/0157987 A1 Jun. 12, 2014

(30) Foreign Application Priority Data

Jan. 18, 2011 (JP) .................. 2011-008186
Jan. 11, 2012 (JP) .................. 2012-002938

(51) Int. Cl.
*C01B 39/46* (2006.01)
*F01N 3/08* (2006.01)
(Continued)

(52) U.S. Cl.
CPC ............. *B01J 20/3085* (2013.01); *B01D 53/02* (2013.01); *B01J 20/28061* (2013.01);
(Continued)

(58) Field of Classification Search
CPC ............. B01D 53/02; B01D 2253/108; B01D 2253/1085; B01D 2253/306; B01D 2253/311; B01D 2257/404; B01D 2257/702; B01D 2258/01; B01J 20/28071; B01J 20/2805; B01J 20/28061; C01B 39/065; C01B 39/46; C01P 2006/12; C01P 2006/14; F01N 3/0835; F01N 3/0842

USPC .............. 95/129, 143, 900, 902; 96/108; 423/213.2, 239.2, DIG. 27; 502/74, 439
See application file for complete search history.

(56) References Cited

U.S. PATENT DOCUMENTS

| 4,923,690 A | 5/1990 | Valyocsik et al. |
| 2008/0083213 A1* | 4/2008 | Tanada et al. ............ 60/297 |

(Continued)

FOREIGN PATENT DOCUMENTS

| DE | 19712727 C1 | 9/1998 |
| JP | 61-10022 A | 1/1986 |

(Continued)

OTHER PUBLICATIONS

German First Official Communication dated Aug. 13, 2014, issued in corresponding German Patent Application No. 112012000495.7 with English translation (9 pages).

(Continued)

*Primary Examiner* — Frank Lawrence
(74) *Attorney, Agent, or Firm* — Westerman, Hattori, Daniels & Adrian, LLP

(57) ABSTRACT

To provide an Fe(II)-substituted beta type zeolite which has been ion-exchanged with Fe(II) ions and can effectively adsorb and remove nitrogen monoxide or hydrocarbon contained in gas to be cleaned, even if oxygen is present in the gas at a high concentration or the temperature of the gas is low. In the Fe(II)-substituted beta type zeolite, a ratio of $SiO_2/Al_2O_3$ is preferably 10 to 18, a BET specific surface area is preferably 400 $m^2/g$ to 700 $m^2/g$, a micropore specific surface area is preferably 290 $m^2/g$ to 500 $m^2/g$, and a micropore volume is preferably 0.15 $cm^3/g$ to 0.25 $cm^3/g$. The amount of Fe(II) supported is preferably 0.01% by mass to 6.5% by mass based on the Fe(II)-substituted beta type zeolite.

10 Claims, 6 Drawing Sheets

(51) Int. Cl.
- B01J 20/30 (2006.01)
- B01J 20/28 (2006.01)
- C01B 39/06 (2006.01)
- B01D 53/02 (2006.01)

(52) U.S. Cl.
CPC ........ B01J 20/28071 (2013.01); C01B 39/065 (2013.01); C01B 39/46 (2013.01); *B01D 2253/108* (2013.01); *B01D 2253/1085* (2013.01); *B01D 2253/306* (2013.01); *B01D 2253/311* (2013.01); *B01D 2257/404* (2013.01); *B01D 2257/702* (2013.01); *B01D 2258/01* (2013.01); *C01P 2006/12* (2013.01); *C01P 2006/14* (2013.01); *F01N 3/0835* (2013.01); *F01N 3/0842* (2013.01)

(56) References Cited

U.S. PATENT DOCUMENTS

| | | | |
|---|---|---|---|
| 2008/0145310 A1 | 6/2008 | Breuninger | |
| 2009/0082194 A1 | 3/2009 | Tissler et al. | |
| 2009/0318284 A1* | 12/2009 | Kanazawa | 502/74 |
| 2011/0286914 A1* | 11/2011 | Li et al. | 423/700 |
| 2012/0141370 A1* | 6/2012 | Tokunaga | 423/700 |
| 2012/0190534 A1* | 7/2012 | Itabashi et al. | 502/60 |
| 2013/0004398 A1* | 1/2013 | Grossschmidt et al. | 423/239.2 |
| 2014/0322126 A1* | 10/2014 | Kubota et al. | 423/714 |

FOREIGN PATENT DOCUMENTS

| | | |
|---|---|---|
| JP | 07-247114 A | 9/1995 |
| JP | 2002-321912 A | 11/2002 |
| JP | 2007-076990 A | 3/2007 |
| JP | 2008-519748 A | 6/2008 |
| JP | 2008-264702 A | 11/2008 |
| JP | 2009-520583 A | 5/2013 |
| WO | 2006/011575 A1 | 2/2006 |
| WO | 2010/146156 A1 | 12/2010 |
| WO | 2011/013560 A1 | 2/2011 |

OTHER PUBLICATIONS

International Search report for PCT/JP2012/050778, Mailing Date of Apr. 24, 2012.

* cited by examiner

FE(II)-SUBSTITUTED BETA TYPE ZEOLITE, GAS ADSORBENT CONTAINING SAME AND METHOD FOR PRODUCING SAME, AND METHOD FOR REMOVING NITROGEN MONOXIDE AND HYDROCARBON

TECHNICAL FIELD

The present invention relates to an Fe(II)-substituted beta type zeolite and a gas adsorbent containing same and a method for producing same. The present invention also relates to an adsorbent for adsorbing and removing nitrogen monoxide gas or hydrocarbon gas in a gas phase such as exhaust gas of an internal combustion engine and a method for removing nitrogen monoxide gas or hydrocarbon gas from the gas phase.

BACKGROUND ART

There is a suggestion that a beta type zeolite having undergone ion exchange with iron ions may be used as a catalyst for cleaning exhaust gas from automobiles (refer to Patent Documents 1 to 3). For example, Patent Document 1 discloses a denitration catalyst containing a support that is obtained by exchanging ions of a beta type zeolite in which a molar ratio of $SiO_2/Al_2O_3$ is 15 to 300 with $Fe^{3+}$ ions in an amount of 0.1% by mass to 15% by mass, and ferric oxide that is supported on the support.

Patent Document 2 discloses a process of performing ion exchange of a beta type zeolite, which has a skeleton structure where the content of Si belonging to $Q^4$ of a zeolite structure observed in a $^{29}Si$ MAS NMR spectrum is 35% by mass to 47% by mass and in which a molar ratio of $SiO_2/Al_2O_3$ is equal to or higher than 20 and less than 100, so as to cause $Fe^{3+}$ to be supported on the zeolite, and bringing the zeolite into contact with exhaust gas containing nitrogen monoxide.

Patent Document 3 discloses a method for producing a $NO_X$ adsorbent. This method includes an impregnation step for preparing an iron chloride-containing zeolite by impregnating a beta type zeolite with an aqueous iron chloride solution, an ion exchange step for heating the iron chloride-containing zeolite at 330° C. to 500° C. in a moisture-free atmosphere so as to cause ion exchange by using Fe, and a thermal treatment step for thermally treating the iron chloride-containing zeolite obtained after the ion exchange step in a non-oxidizing atmosphere.

CITATION LIST

Patent Literature

[PTL 1] Pamphlet of international Publication No. WO2006/011575
[PTL 2] Japanese Unexamined Patent Application Publication No. 2007-076990
[PTL 3] Japanese Unexamined Patent Application Publication No. 2008-264702

SUMMARY OF INVENTION

Technical Problem

However, when nitrogen monoxide is removed in a catalytic manner, if oxygen is present in exhaust gas at a high concentration, or the temperature of exhaust gas is low, it is not easy to effectively adsorb and remove nitrogen monoxide even if the above materials are used.

Solution to Problem

The present inventors conducted thorough research, and as a result, they found that if an Fe(II)-substituted beta type zeolite which has been ion-exchanged with divalent iron and has specific physical properties is used, the above problems may be solved.

That is, the present invention provides an Fe(II)-substituted beta type zeolite which has been ion-exchanged with Fe(II) ions, in which a ratio of $SiO_2/Al_2O_3$ is 10 to 18, a BET specific surface area is 400 m²/g to 700 m²/g, a micropore specific surface area is 290 m²/g to 500 m²g, and a mocropore volume is 0.15 cm³/g to 0.25 cm³/g.

The present invention also provides a gas adsorbent containing the Fe(II)-substituted beta type zeolite.

Moreover, the present invention provides a method for producing Fe(II)-substituted beta type zeolite, including a step of causing Fe(II) ions to be supported on a beta type zeolite by dispersing the beta type zeolite, in which a ratio of $SiO_2/Al_2O_3$ is 10 to 16, a BET specific surface area that is measured in a state of sodium type is 500 m²/g to 700 m²/g, a micropore specific surface area is 350 m²/g to 500 m²/g, and a micropore volume is 0.15 cm³/g to 0.25 cm³/g, in an aqueous solution of a water-soluble divalent iron compound, and performing mixing under stirring.

In addition, the present invention provides a method for removing nitrogen monoxide, including causing the nitrogen monoxide to be adsorbed onto an Fe(II)-substituted beta type zeolite by bringing the nitrogen monoxide or nitrogen monoxide-containing gas into contact with the Fe(II)-substituted beta type zeolite which has been ion-exchanged with Fe(ii) ions and in which a ratio of $SiO_2/Al_2O_3$ is 10 to 18, a BET specific surface area is 400 m²/g to 700 m²/g, a micropore specific surface area is 290 m²/g to 500 m²/g, and a micropore volume is 0.15 cm³/g to 0.25 cm³/g.

The present invention also provides a method for removing hydrocarbon, including causing the hydrocarbon to be adsorbed onto an Fe(II)-substituted beta type zeolite by bringing the hydrocarbon or hydrocarbon-containing gas into contact with the Fe(II)-substituted beta type zeolite which has been ion-exchanged with Fe(II) ions and in which a ratio of $SiO_2/Al_2O_3$ is 10 to 18, a BET specific surface area is 400 m²/g to 700 m²/g, a micropore specific surface area is 290 m²/g to 500 m²/g, and a micropore volume is 0.15 cm³/g to 0.25 cm³/g.

Advantageous Effects of Invention

According to the present invention, an Fe(II)-substituted beta type zeolite useful for removing various types of gas in a catalytic manner and a production method thereof are provided. Particularly, according to the present invention, when nitrogen monoxide or hydrocarbon is removed in a catalytic manner, even if oxygen is present at a high concentration in gas to be cleaned, or if the temperature of the gas to be cleaned is low, the nitrogen monoxide or hydrocarbon contained in the gas can be effectively adsorbed and removed.

BRIEF DESCRIPTION OF DRAWINGS

FIG. 7(b) is an X-ray diffraction diagram of an Fe(II) beta type zeolite used in Comparative example 1.

DESCRIPTION OF EMBODIMENTS

Figure 1:
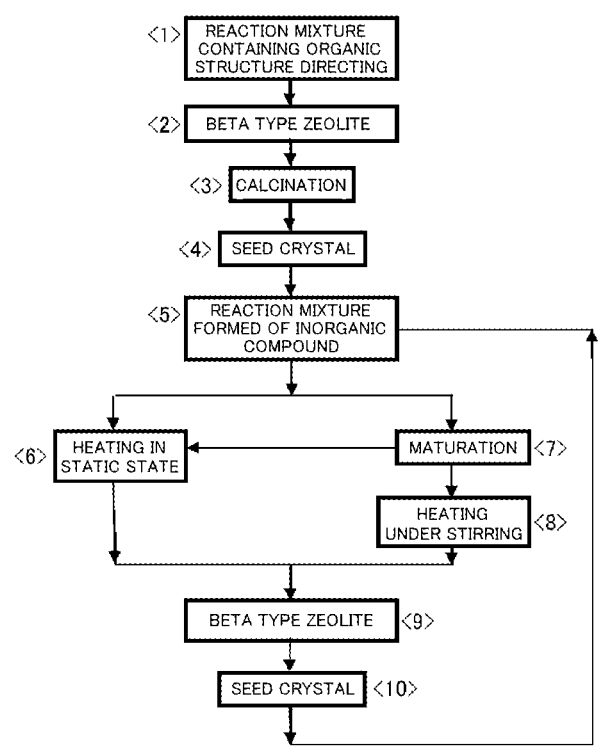
FIG. 1 is a chart of a process for producing a beta type zeolite before substitution that is used in the present invention.

Hereinafter, the present invention will be described based on preferable embodiments. The present invention relates to an Fe(II)-substituted beta type zeolite obtained by exchanging ions of a beta type zeolite with Fe(II) ions. The present invention also relates to a gas adsorbent containing the Fe(II)-substituted beta type zeolite. Cations present in an [$AlO_2$] site in a beta type zeolite are exchanged with Fe(II) ions, whereby the Fe(II) ions are supported on the beta type zeolite. A key point of the present invention is that iron ions exchanged with cations contained in the beta type zeolite are Fe(II) ions. When iron ions exchanged with cations are Fe(III) ions, a desired level of gas removing effect cannot be exerted. The present inventors assume that this may be related to the use of a substance having specific values of physical properties described later as the beta type zeolite.

When iron ions exchanged with cations are Fe(III) ions, a desired level of gas removing effect cannot be exerted. However, this does not hinder the Fe(II)-substituted beta type zeolite used in the present invention from supporting Fe(III) ions. That is, the Fe(II)-substituted beta type zeolite is allowed to support Fe(III) ions.

In the present invention, examples of gas to be adsorbed onto the Fe(II)-substituted beta type zeolite include nitrogen monoxide gas or hydrocarbon gas that is gas contained in exhaust gas of an internal combustion engine. The Fe(II)-substituted beta type zeolite of the present invention is effective for adsorbing hydrocarbon gas, particularly, aklanes such as methane, ethane, propane, butane, pentane, hexane, n-heptane, and isooctane, alkenes such as ethylene, propylene, butene, pentene, methyl pentene, hexene, and methyl hexene, and aromatics such as benzene, toluene, xylene, and trimethylbenzene, and the like. When gas to be treated contains both the nitrogen monoxide and hydrocarbon, if the Fe(II)-substituted beta type zeolite of the present invention is used, both the gases can be adsorbed at the same time.

The amount of Fe(II) contained in the Fe(II)-substituted beta type zeolite, that is, the amount of Fe(II) supported is preferably 0.01% by mass to 6.5% by mass, more preferably 0.05% by mass to 6.0% by mass, even more preferably 0.1% by mass to 5.0% by mass, and still more preferably 0.6% by mass to 5.0% by mass, based on the Fe(II)-substituted beta type zeolite. If the amount of Fe(II) supported is set within this range, adsorption efficiency of nitrogen monoxide or hydrocarbon can be improved effectively.

The amount of Fe(II) supported that is contained in the Fe(II)-substituted beta type zeolite is measured by the following method. First, the Fe(II)-substituted beta type zeolite to be measured is weighed. The Fe(II)-substituted beta type zeolite is dissolved in hydrogen fluoride (HF), and the amount of divalent iron in the solution is determined using an inductively coupled plasma-optical emission spectrometer. The determined mass of divalent iron is divided by the mass of the Fe(II)-substituted beta type zeolite and multiplied by 100 to calculate the amount (%) of Fe(II) supported that is contained in the Fe(II)-substituted beta type zeolite.

For causing Fe(II) ions to be supported on a beta type zeolite, for example, the following method can be employed. A beta type zeolite is dispersed in an aqueous solution of a water-soluble divalent iron compound, followed by mixing under stirring. It is preferable that the beta type zeolite be mixed in a proportion of 0.5 parts by mass to 7 parts by mass based on 100 parts by mass of the aqueous solution. The amount of the water-soluble divalent iron compound added may be appropriately set according to the extent of ion exchange.

The mixing under stirring may be performed at room temperature or under heating. When the mixing under stirring is performed under heating, it is preferable to set the solution temperature to 10° C. to 30° C. In addition, the mixing under stirring may be performed in the atmosphere or in an inert gas atmosphere such as a nitrogen atmosphere.

During the mixing under stirring, a compound for preventing divalent iron from oxidizing into trivalent iron may be added to the solution. As such a compound, ascorbinc acid, which is a compound that does not hinder ion exchange of Fe(II) ions and can prevent Fe(II) ions from oxidizing into Fe(III) ions, is preferable. The amount of ascorbic acid added is preferably 0.1 to 3 times, particularly preferably 0.2 to 2 times the mole number of the divalent iron added, in view of effectively preventing oxidization of divalent iron.

After the mixing under stirring is performed for a predetermined time, the solid contents are filtered by suction filtration, followed by washing with water and drying, whereby a target Fe(II)-substituted beta type zeolite is obtained. The X-ray diffraction diagram of the Fe(II)-substituted beta type zeolite is almost the same as the X-ray diffraction diagram of the beta type zeolite on which Fe(II) ions have not yet been supported. That is, the crystal structure of the zeolite does not change by ion exchange.

In the Fe(II)-substituted beta type zeolite used in the present invention, a ratio of $SiO_2/Al_2O_3$ is 10 to 18 and preferably 10 to 17. Moreover, a BET specific surface area is 400 $m^2/g$ to 700 $m^2/g$, preferably 400 $m^2/g$ to 600 $m^2/g$, and even more preferably 400 to 520. Further, a micropore specific surface area is 290 $m^2/g$ to 500 $m^2/g$ and more preferably 300 $m^2/g$ to 480 $m^2/g$. In addition, a micropore volume is 0.15 $cm^3/g$ to 0.25 $cm^3/g$ and preferably 0.16 $cm^3/g$ to 0.24 $cm^3/g$. The use of the Fe(II)-substituted beta type zeolite having these values of physical properties improves adsorption characteristics of nitrogen monoxide or hydrocarbon. Furthermore, as described later, these values of physical properties are not greatly different from the corresponding values of physical properties of a beta type zeolite which has not yet been ion-exchanged with Fe(II) ions.

The Fe(II)-substituted beta type zeolite used in the present invention is particularly excellent in a property of trapping nitrogen monoxide or hydrocarbon discharged at the time of cold start of an internal combustion engine. At the time of cold start of a gasoline engine or a diesel engine, the temperature of a three-way catalyst is not high enough, and accordingly, it is difficult to effectively clean the exhaust gas by using the three-way catalyst. However, if an adsorbent (catalyst) containing the Fe(II)-substituted beta type zeolite used in the present invention is used separately from the three-way catalyst, nitrogen monoxide contained in the exhaust gas that is at a relatively low temperature at the time of cold start can be trapped, whereby the exhaust gas can be cleaned. When several minutes elapses from the cold start, and the temperature reaches around an operating temperature of the three-way catalyst, nitrogen monoxide or hydrocarbon trapped in the Fe(II)-substituted beta type zeolite used in the present invention is discharged, and the discharged nitrogen monoxide or hydrocarbon is cleaned by the three-way catalyst that has reached the operating temperature.

In the present invention, as the beta type zeolite as a zeolite which is ion-exchanged with Fe(II) ions, it is preferable to use a beta type zeolite having specific values of physical properties. Specifically, one of the characteristics of the beta type zeolite used in the present invention (hereinafter, this zeolite will be called a "beta type zeolite before substitution" so as to be compared with the Fe(II)-substituted beta type zeolite) is that though it shows a low $SiO_2/Al_2O_3$ ratio and is rich in aluminum, the beta type zeolite has a large BET specific surface area and micropore specific surface area and a high micropore volume. Beta type zeolites having a low $SiO_2/Al_2O_3$ ratio are known so far, but the BET specific surface area or micropore specific surface area and micropore volume of these beta type zeolites are not great. In order to increase the BET specific surface area or micropore specific surface area and micropore volume of beta type zeolites known so far, the ratio of $SiO_2/Al_2O$ should be increased.

In the beta type zeolite before substitution, the ratio of $SiO_2/Al_2O_3$ is 10 to 16 and preferably 10 to 14, so the zeolite is rich in aluminum. In the aluminum-rich beta type zeolite before substitution, a BET specific surface area that is measured in a state of a sodium type is 500 $m^2/g$ to 700 $m^2/g$ and preferably 550 $m^2/g$ to 700 $m^2/g$ which are high values. Moreover, a micropore specific surface area that is measured in a stat of a sodium type is 350 $m^2/g$ to 500 $m^2/g$ and preferably 380 $m^2/g$ to 500 $m^2/g$ which are high values. Further, a micropore volume that is measured in a state of a sodium type is 0.15 $cm^3/g$ to 0.25 $cm^3/g$ and preferably 0.18 $cm^3/g$ to 0.25 $cm^3/g$ which are high values.

As mentioned before, the values of the ratio of $SiO_2/Al_2O$, BET specific surface area, micropore specific surface area, and micropore volume in the beta type zeolite before substitution are not greatly different from the corresponding values of the Fe(II)-substituted beta type zeolite.

The beta type zeolite before substitution includes sodium type zeolites as well as $H^+$ type zeolites formed when sodium ions are exchanged with protons. When the beta type zeolite is an $H^+$ type, the above specific surface area and the like are measured after protons are substituted with sodium ions. In order to convert the sodium-type beta type zeolite into the $H^+$ type, for example, the sodium-type beta type zeolite is dispersed in an aqueous solution of an ammonium salt such as ammonium nitrate to substitute sodium ions in the zeolite with ammonium ions. If the ammonium-type beta type zeolite is calcined, an $H^+$-type beta type zeolite is obtained.

As described later in Examples, the above specific surface area or volume is measured using a BET specific surface area measuring instrument.

The beta type zeolite before substitution used in the present invention is characterized in that the values of the ratio of $SiO_2/Al_2O$, BET specific surface area, micropore specific surface area, and micropore volume described above are different from those of the beta type zeolite of the related art, and the X-ray diffraction diagram thereof is also different. Specifically, in the beta type zeolite of the related art, a peak height observed at around $2\theta=23°$ is practically the same as a peak height observed at around $2\theta=7°$ (see FIG. 7(a) and FIG. 8(a) described later). However, in the beta type zeolite before substitution used in the present invention, a peak height observed at around $2\theta=7°$ is extremely lower than a peak height observed at around $2\theta=23°$ (see FIGS. 3 to 6 described later).

The aluminum-rich beta type zeolite before substitution having the above physical properties is preferably produced by a production method described later. In the present invention, presumably, by the use of the production method, defectiveness that is sometimes caused in a crystal structure of the obtained beta type zeolite before substitution may be inhibited, and for this reason, the beta type zeolite before substitution can obtain the above physical properties. However, the detail thereof is unclear.

Next, the preferable production method of the beta type zeolite before substitution will be described with reference to FIG. 1. In FIG. 1, the synthesis method of a beta type zeolit of the related art that uses an organic SDA is performed in order of <1>, <2>, and <3>. A method performed in order of <1>, <2>, <3>, <4>, <5>, <6>, and <9> is also known (for example, the specification of Chinese Patent Application No. 101249968A (hereinafter, also called a "method of related art")). In the method of related art, a seed crystal is necessarily used, and for producing the seed crystal, an organic compound such as a tetraethyl ammonium ion is necessarily used as a structure directing agent (hereinafter, also called "SDA"). Moreover, in order to use the beta type zeolite obtained by the method of related art as a seed crystal, tetraethyl ammonium ions need to be removed by calcining the zeolite at a high temperature.

Regarding this method, the beta type zeolite before substitution can be produced by six methods in the present invention. The first method is a method that is performed in order of <1>, <2>, <3>, <4>, <5>, <6>, and <9> just like the method of related art. Here, this method differs from the method of related art, in terms of the ration of $SiO_2/Al_2O_3$ of the seed crystal and the composition of the reaction mixture. Therefore, according to the present invention, it is possible to produce a beta type zeolite before substitution having a wide range of $SiO_2/Al_2O_3$ ratio. The second method is a method that is performed in order of <1>, <2>, <3>, <4>, <5>, <7>, <6>, and <9>. In this method, after maturation, heating is performed in a static state, whereby a seed crystal having a low $SiO_2/Al_2O_3$ ratio can be effectively used.

The third method is a method that is performed in order of <1>, <2>, <3>, <4>, <5>, <7>, <8>, and <9>. This method differs from the method of related art, in terms of the ratio of $SiO_2/Al_2O_3$ of the seed crystal and the composition of the reaction mixture.

The present production method can also be performed in the following three types of orders.

<10>, <5>, <6>, <9>
<10>, <5>, <7>, <6>, <9>
<10>, <5>, <7>, <8>, <9>

The ratio of $SiO_2/Al_2O_3$ or the composition of the reaction mixture in these cases is different from that of the method of related art. In addition, in these three methods, as a seed crystal to be used, the beta type zeolite before substitution obtained by the method of the present invention is used. That is, in these three methods, the seed crystal can be used repeatedly, and therefore, an organic SDA basically is not used. To summarize, these three production methods can be mentioned as methods for producing a beta type zeolite that are performed by a green process ultimately resulting in less environmental load.

The method of a beta type zeolite before substitution used in the present invention will be described in more detail. The method performed in order of <1>, <2>, and <3> in FIG. 1 is the same as the method of related art that uses an organic SDA. Regarding the seed crystal of <4> in FIG. 1, in the method of related art, the range of the $SiO_2/Al_2O_3$ ratio of the seed crystal is limited within a narrow range such as 22 to 25. On the other hand, one of the characteristics of the present production method is the $SiO_2/Al_2O_3$ ratio of the seed crystal shown in <4> in FIG. 1. In the present production method, it is possible to use a seed crystal having the $SiO_2/Al_2O_3$ ratio within a range of 8 to 30. It is extremely difficult to synthesize a beta type zeolite in which the $SiO_2/Al_2O_3$ ratio of the seed crystal is less than 8, so such a seed crystal is not used in general. Moreover, if the $SiO_2/Al_2O_3$ ratio of the seed crystal exceeds 30, the product easily becomes ZSM-5 without depending on the composition of the reaction mixture. In the present production method, the amount of the seed crystal added is within a range of 0.1% by mass to 20% by mass, based on a silica component contained in the reaction mixture. It is preferable that the added amount be small, but the amount is determined considering the reaction rate, the effect of suppressing impurities, or the like. The added amount is preferably 1% by mass to 20% by mass and more preferably 1% by mass to 10% by mass.

The average particle size of the seed crystal of the beta type zeolite used in the present production method is 150 nm or larger, preferably 150 nm to 1000 nm, and even more preferably 200 nm to 600 nm. The size of the crystal of beta type zeolite before substitution obtained by synthesis is not uniform in general and has a particle size distribution to some extent. It is not difficult to determine a crystal particle size that is observed most frequently. The average particle size refers to a particle diameter of a crystal that is most frequently observed by a scanning electron microscope. The average particle size of the beta type zeolite using the organic SDA is small and within a range of 100 nm to 1000 nm in general. However, there are also particles larger than 1000 nm though the particle size is unclear since small particles are aggregated together. In addition, in order to synthesize crystals equal to or smaller than 100 nm, a special device is required, and it costs a lot. Accordingly, in the present production method, a beta type zeolite having an average particle size of 150 nm or larger is used as a seed crystal. The average particle size of the beta type zeolite before substitution obtained by the present production method is also in this range, so the beta type zeolite can be preferably used as a seed crystal.

The reaction mixture to which a seed crystal is added is obtained by mixing a silica source, an alumina source, and an alkali source with water, such that a composition represented by the following molar ratio is formed. If the composition of the reaction mixture is out of this range, a target beta type zeolite before substitution cannot be obtained.

$SiO_2/Al_2O_3$=40 to 200
$Na_2O/SiO_2$=0.22 to 0.4
$H_2O/SiO_2$=10 to 50

A more preferable range of the composition of the reaction mixture is as follows.

$SiO_2/Al_2O_3$=44 to 200
$Na_2O/SiO_2$=0.24 to 0.35
$H_2O/SiO_2$=15 to 25

It is also preferable to employ the following range for the composition of the reaction mixture.

$SiO_2/Al_2O_3$=10 to 40
$Na_2O/SiO_2$=0.05 to 0.25
$H_2O/SiO_2$=5 to 50

An even more preferable range of the composition of the reaction mixture is as follows.

$SiO_2/Al_2O_3$=12 to 40
$Na_2O/SiO_2$=0.1 to 0.25
$H_2O/SiO_2$=10 to 25

Examples of the silica source used for obtaining the reaction mixture having the above molar ratio include silica itself and silicon-containing compounds that can generate silicate ions in water. Specific examples thereof include wet method silica, dry method silica, colloidal silica, sodium silicate, aluminosilicate, and the like. One kind of these silica sources can be used alone, or two or more kinds thereof can be used in combination. It is preferable to use silica (silicon dioxide) among these silica sources, since it is possible to obtain a zeolite without producing unnecessary by-products.

As the alumina source, for example, water-soluble aluminum-containing compounds can be used. Specific examples thereof include sodium aluminate, aluminum nitrate, aluminum sulfate, and the like. Moreover, aluminum hydroxide is also one of the preferable alumina sources. One kind of these alumina sources can be used alone, or two or more kinds thereof can be used in combination. It is preferable to use sodium aluminate or aluminum hydroxide among these alumina sources, since it is possible to obtain a zeolite without producing unnecessary by-products (for example, sulfate or nitrate).

As the alkali source, for example, sodium hydroxide can be used. In addition, when sodium silicate is used as the silica source or when sodium aluminate is used as the alumina source, sodium as an alkaline metal component contained in the above sources is regarded as NaOH as well and also is an alkaline component. Accordingly, the amount of the $Na_2O$ is calculated as the total amount of all alkaline components in the reaction mixture.

For preparing the reaction mixture, a method may be employed in which the respective raw materials are added in such order that makes it possible to easily obtain a uniform reaction mixture. For example, an alumina source is added and dissolved in an aqueous sodium hydroxide solution at room temperature, and then a silica source is added thereto, followed by mixing under stirring, whereby a uniform reaction mixture can be obtained. A seed crystal is added thereto while being mixed with the silica source or after the silica source is added. Thereafter, the solution is stirred and mixed such that the seed crystal evenly disperses. The temperature for preparing the reaction mixture is not particularly limited and may be room temperature (20° C. to 25° C.) in general.

The reaction mixture containing a seed crystal is put into a sealed container and reacted by heating, whereby a beta type zeolite is crystallized. The organic SDA is not contained in the reaction mixture. As a method for performing crystallization, the reaction mixture is heated in a static state without being matured, as described in the method of related art. (order of <4>, <5>, <6>, and <9>).

On the other hand, when a seed crystal having a low $SiO_2/Al_2O_3$ ratio is used, if the reaction mixture is matured and then heated without being stirred, crystallization occurs easily (order of <4>, <5>, <7>, <6>, and <9>). Maturation refers to an operation of holding the reaction mixture at a temperature lower than the reaction temperature for a certain time. During maturation, the reaction mixture is allowed to be in a static state without being stirred. It is known that by performing maturation, effects of preventing production of impurities as a by-product, making it possible to perform heating under stirring without producing impurities as a by-product, increasing the reaction rate, and the like are exerted, but mechanism of action thereof is not necessarily clear. The temperature and time of maturation are set such that the above effects are exerted to a maximum extent. In the present production method, the maturation is performed preferably at 20° C. to 80° C. and more preferably at 20° C. to 60° C., preferably within a range of from 2 hours to 1 day.

When the reaction mixture is stirred so as to uniformize the temperature thereof during heating, if heating under stirring is performed after maturation is conducted, it is possible to prevent impurities from being produced as a by-product (order of <4>, <5>, <7>, <8>, and <9>). Stirring is performed to uniformize the composition and temperature of the reaction mixture, and mixing is performed by a stirring blade, or rotation of the container, and the like. The stirring strength or rotation frequency may be adjusted according to the uniformity of temperature or to how the impurities are produced as a by-product. Stirring may be performed continuously or intermittently. If maturation and stirring are combined with each other in this way, industrial mass production can be realized.

The following three methods are methods for producing beta type zeolite before substitution that are performed by a green process which is a characteristic of the present production method. According to these three methods, the beta type zeolite before substitution obtained by the present production method can be reproduced infinitely by using itself as a seed crystal, and a production process totally not using the organic SDA can be performed. That is, the methods include a method performed in order of <10>, <5>, <6>, and <9>, a method performed in order of <10>, <5>, <7>, <6>, and <9>, and a method performed in order of <10>, <5>, <7>, <8>, and <9>. The characteristics of the respective steps are as described above. The $SiO_2/Al_2O_3$ ratio of the beta type zeolite before substitution obtained by the present production method is preferably within a range of 8 to 30. When the beta type zeolite before substitution obtained by the present production method is used as a seed crystal, even if the ration of $SiO_2/Al_2O_3$ thereof is low, the beta type zeolite can be crystallized without performing the maturation operation if the zeolite is synthesized in a static state. When a beta type zeolite synthesized using the organic SDA is used as a seed crystal, the zeolite is used after being calcined. However, when the beta type zeolite before substitution obtained by the present production method is used, it does not need to be calcined. Presumably, this difference may make a difference in the effect of the zeolite as a seed crystal, but the detail thereof is unclear. However, if heating under stirring is performed, it is preferable to perform maturation.

In both the static method and stirring method, the heating temperature is 100° C. to 200° C. and preferably within a range of 120° C. to 180° C., and the heating is performed under autogeneous pressure. If the temperature is lower than 100° C., the crystallization rate becomes extremely low, so efficiency in generating the beta type zeolite becomes poor. On the other hand, if the temperature exceeds 200° C., an autoclave having a high degree of pressure resistance is required. Accordingly, the economic efficiency becomes deficient, and impurities are also generated at a high rate. The heating time is not critical in the present production method, and heating may be performed until a beta type zeolite having a sufficiently high degree of crystallinity is generated. Generally, if heating is performed for about 5 to 150 hours, a beta type zeolite before substitution that has satisfactory crystallinity is obtained.

In the present production method, when the heating time is insufficient, amorphous components are also generated. In addition, if heating is further continued after crystallization of the beta type zeolite ends, mordenite starts to grow, whereby the proportion of the beta type zeolite decreases. The time for which only a target beta type zeolite before substitution is stably present as a monophase varies with the temperature and is not long in general. In order to obtain a monophase beta type zeolite, heating is completed before mordenite starts to grow, and the sealed container is cooled to end the reaction.

By the heating, crystals of the beta type zeolite before substitution are obtained. After the heating ends, the generated crystal powder is separated from the mother liquor by filtration and then washed with water or warm water, followed by drying. The crystals in a dried state do not contain an organic substance, so they do not need to be calcined.

The beta type zeolite before substitution obtained in this manner is ion-exchanged with Fe(II) ions as described above, whereby an Fe(II)-substituted beta type zeolite is obtained. The Fe(II)-substituted beta type zeolite may be used as is as an adsorbent of various types of gas such as nitrogen monoxide or hydrocarbon or as a gas adsorbent containing the Fe(II)-substituted beta type zeolite. Regardless of the form of the Fe(II)-substituted beta type zeolite, if the Fe(II)-substituted beta type zeolite is brought into contact with various types of gas such as nitrogen monoxide or hydrocarbon in a manner of solid-gas contact, the gases can be adsorbed onto the Fe(II)-substituted beta type zeolite.

In the present invention, nitrogen monoxide gas or hydrocarbon gas itself is brought into contact with the Fe(II)-substituted beta type zeolite so as to be adsorbed onto the zeolite. In addition, gas containing nitrogen monoxide gas or hydrocarbon gas can be brought into contact with the Fe(II)-substituted beta type zeolite such that the nitrogen monoxide gas or hydrocarbon gas in the gas is adsorbed onto the zeolite, whereby the nitrogen monoxide gas or hydrocarbon gas can be removed from the gas. Examples of such gas include exhaust gas of an internal combustion engine that uses hydrocarbon such as gasoline or diesel as a fuel, exhaust gas produced from various boilers or incinerators, and the like.

EXAMPLES

Hereinafter, the present invention will be described in more detail based on examples, but the scope of the present invention is not limited to the examples. Unless otherwise specified, "%" means "% by mass". Moreover, analytical instruments used in the following examples, comparative examples, and reference examples are as follows.

Powder X-ray diffractometer: manufactured by MAC Science, Co, powder X-ray diffractometer MO3XHF[22], using a CuKα ray, a voltage of 40 kV, a current of 30 mA, a scanning step of 0.02°, and a scanning rate of 2°/min Ratio of $SiO_2/Al_2O_3$: a beta type zeolite was dissolved in hydrogen fluoride (HF), and this solution was analyzed using ICP to determine the amount of Al. In addition, a beta type zeolite was dissolved in potassium hydroxide (KOH), and this solution was analyzed using ICP to determine the amount of Si. Based on the determined amount of Si and Al, a ratio of $SiO_2/Al_2O$ was calculated.

Instrument for measuring BET surface area, micropore specific surface area, and micropore volume: manufactured by Quantachrome Instruments, AUTOSORB-1

Example 1

Figure 2:
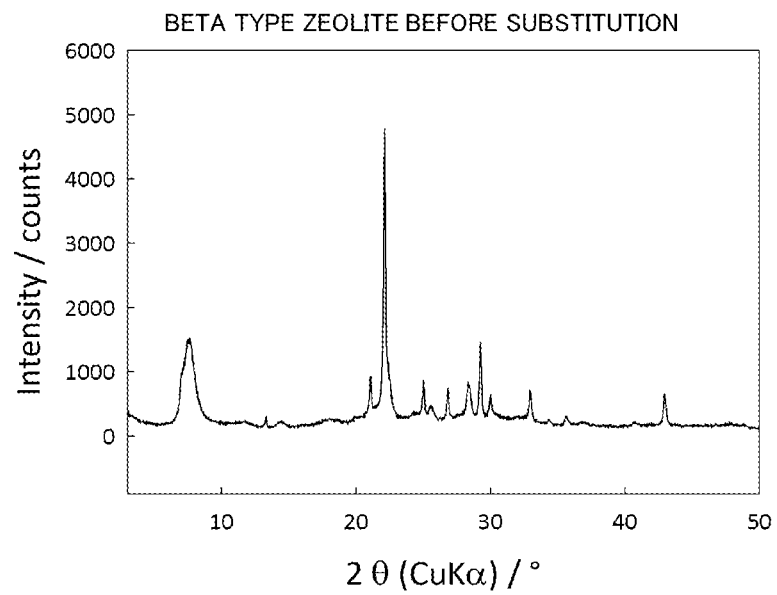
FIG. 2 is an X-ray diffraction diagram of a beta type zeolite before substitution that is obtained in Example 1.

(1) Production of Beta Type Zeolite Before Substitution 0.235 g of sodium aluminate and 1.828 g of 36% sodium hydroxide were dissolved in 13.9 g of pure water. A mixture of 2.024 g of powdery silica and 0.202 g of a seed crystal of a beta type zeolite having a $SiO_2/Al_2O_3$ ratio of 24.0 was added little by little to the above aqueous solution, and the resultant was stirred and mixed, thereby obtaining a reaction mixture having a composition in which $SiO_2/Al_2O_3=40$, $Na_2O/SiO_2=0.275$, and $H_2O/SiO_2=25$. The seed crystal of a beta type zeolite was obtained using SDA by the following method. The reaction mixture was put into a 60 cc sealed container made of stainless steel and heated in a static state under autogeneous pressure for 46 hours at 140° C. without being matured and stirred. After the sealed container was cooled, the product was filtered and washed with warm water, thereby obtaining white powder. FIG. 2 shows the X-ray diffraction diagram of the product. As seen in the diagram, the product was a beta type zeolite not containing impurities such as SDA. Table 1 shows values of physical properties of the beta type zeolite before substitution obtained in this manner.

Method for Producing Seed Crystal of Beta Type Zeolite

By a known method that uses tetraethylammonium hydroxide as SDA, sodium aluminate as an alumina source, and fine powder-like silica (Mizukasil P707) as a silica source, heating under stirring was performed for 96 hours at 165° C. to synthesize a beta type zeolite having a $SiO_2/Al_2O_3$ ratio of 24.0. The zeolite was calcined for 10 hours in an electric furnace at 550° C. under air flow, thereby producing a crystal not containing an organic substance. From the result of X-ray diffraction, the crystal was confirmed to be a beta type zeolite. The crystal was observed with a scanning electron microscope, and as a result, an average particle size thereof was 280 nm. This beta type zeolite did not contain SDA.

Figure 3:
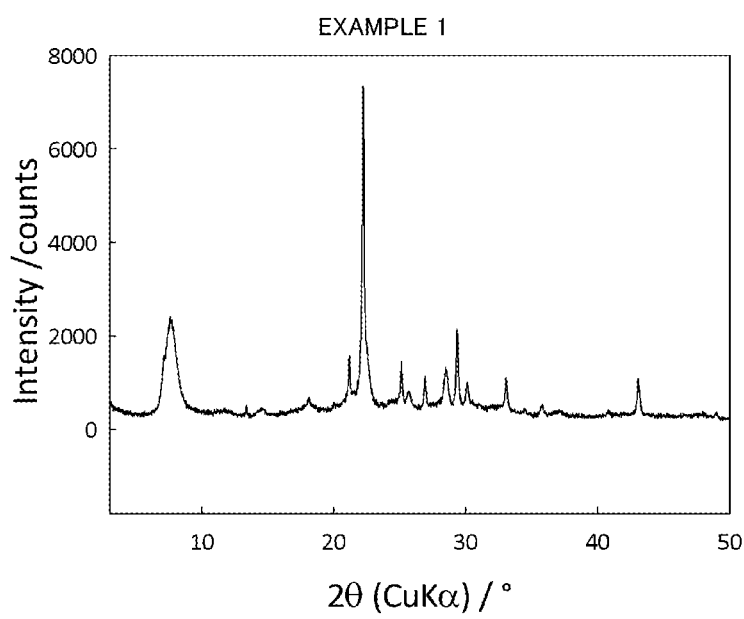
FIG. 3 is an X-ray diffraction diagram of an Fe(II)-substituted beta type zeolite obtained in Example 1.

(2) Production of Fe(II)-Substituted Beta Type Zeolite 40 ml of distilled water, 1.00 g of a beta type zeolite before substitution, and ascorbic acid of a mole number that was two times larger than that of an iron compound to be added were put in a polypropylene container, and then $Fe(II)SO_4 \cdot 7H_2O$ was added thereto in an amount of 1% by mass based on the beta type zeolite before substitution, followed by stirring for 1 day at room temperature in a nitrogen atmosphere. Thereafter, the precipitate was filtered by suction filtration, washed with distilled water, and dried, thereby obtaining a Fe(II)-substituted beta type zeolite on which 0.04% by mass of $Fe^{2+}$ was supported. The amount of $Fe^{2+}$ supported was measured by an inductively coupled plasma-optical emission spectrometer (ICP-AES, manufactured by Varian, Inc., LIBERTY Series II). FIG. 3 shows the X-ray diffraction diagram of the obtained Fe(II)-substituted beta type zeolite. When FIG. 3 (Fe(II)-substituted beta type zeolite) was compared with FIG. 2 (beta type zeolite before substitution), it was found that the position and intensity of peaks practically did not change. Therefore, it was confirmed that the structure of the beta type zeolite was maintained even after ion exchange.

(3) Evaluation of Nitrogen Monoxide Adsorption 20 mg of the Fe(II)-substituted beta type zeolite was accurately weighed by an electronic scale, and then 180 mg of silicon carbide as a diluents was uniformly mixed with the zeolite. The mixture was filled in a quartz glass tube having an inner diameter of 6 mm. Water adsorbed during mixing was removed by being heated with a mantle heater, and then the mixture was cooled to room temperature. Thereafter, 1030 ppm of nitrogen monoxide gas was pulsed by 5 cm³ into the quartz glass tube at every 2 minutes at room temperature. The amount of nitrogen monoxide gas that came out of the quartz glass tube without being adsorbed was calculated from the values detected from the peak area in thermal conductivity gas chromatography (GC-TCD, manufactured by Shimadzu Corporation, GC-8A) and a chemiluminescent NO analyzer (NOx analyzer, manufactured by Yanagimoto Mfg Co., Ltd., ECL-77A). The measurement conditions of thermal conductivity gas chromatography (GC-TCD) were as follows. In addition, the calculated value was subtracted from the amount of nitrogen monoxide gas supplied, thereby obtaining the amount of nitrogen monoxide gas adsorbed onto the Fe(II)-substituted beta type zeolite per unit mass. Table 1 shows the results.

Measurement Conditions of Thermal Conductivity Gas Chromatography (GC-TCD)

Carrier gas: He gas
Flow rate of carrier gas: 30 cm³·min⁻¹
Temperature of detection portion: 100° C.
Flow rate of detection portion: 80 mA

(4) Evaluation of Toluene Gas Adsorption

Toluene, which is typical hydrocarbon contained in exhaust gas discharged from an internal combustion engine, was used as gas to be adsorbed. 20 mg of the Fe(II)-substituted beta type zeolite was put into a quartz tube having an inner diameter of 4 mm and held between the quartz wall and glass beads. The sample was activated for about 1 hour at 390° C. by using helium as a mobile phase. After the column was cooled to 50° C., toluene was injected into the column until the column was saturated. The amount of toluene gas that came out of the quartz glass tube without being adsorbed was calculated from a value detected by a peak area of thermal conductivity gas chromatography (GC-TCD, manufactured by Shimadzu Corporation, GC-8A). The measurement conditions of thermal conductivity gas chromatography (GC-TCD) were as follows. In addition, the calculated value was subtracted from the amount of toluene gas supplied, thereby obtaining the amount of toluene gas adsorbed onto the Fe(II)-substituted beta type zeolite per unit mass. Table 1 shows the results.

Measurement Conditions of Thermal Conductivity Gas Chromatography (GC-TCD)

Carrier gas: He gas
Flow rate of carrier gas: 30 cm³·min⁻¹
Temperature of detection portion: 150° C.
Flow rate of detection portion: 50 mA

Examples 2 to 4

Figure 4:
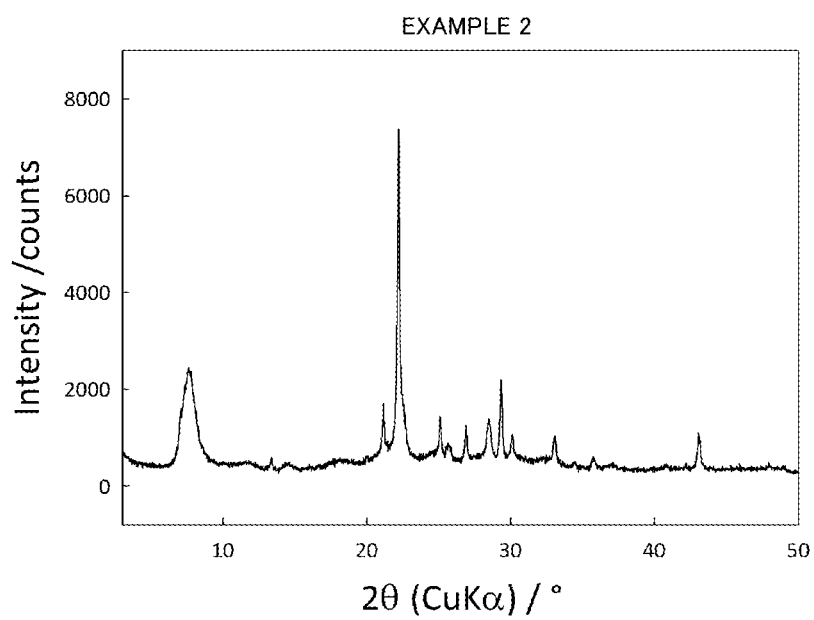
FIG. 4 is an X-ray diffraction diagram of an Fe(II)-substituted beta type zeolite obtained in Example 2.
Figure 5:
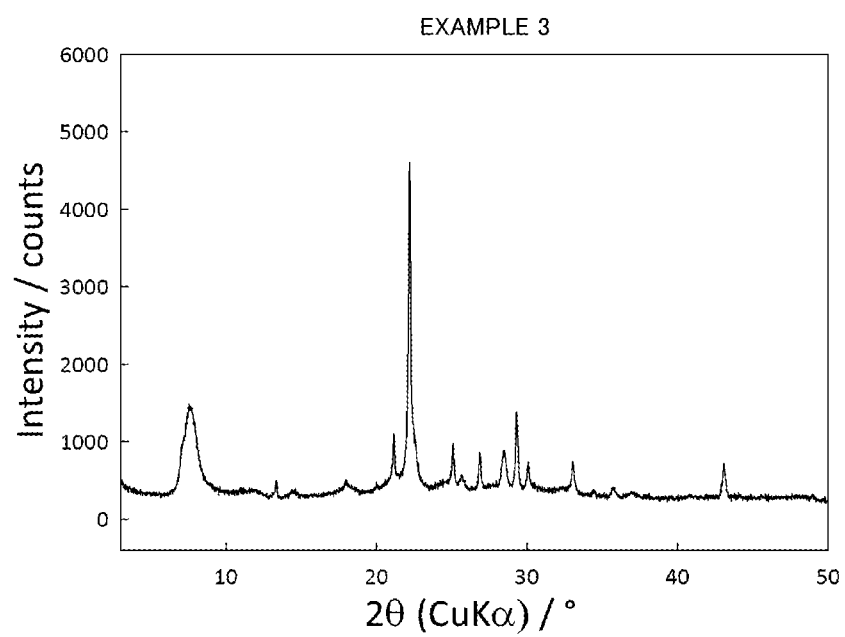
FIG. 5 is an X-ray diffraction diagram of an Fe(II)-substituted beta type zeolite obtained in Example 3
Figure 6:
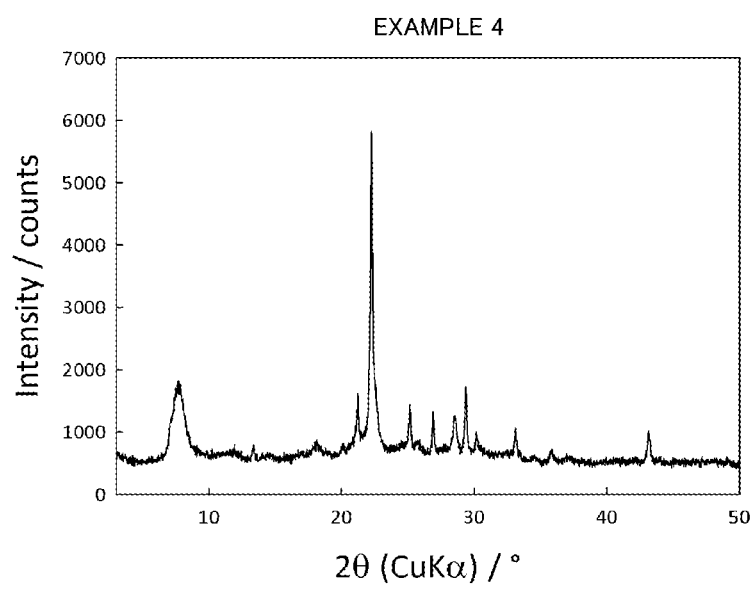
FIG. 6 is an X-ray diffraction diagram of an Fe(II)-substituted beta type zeolite obtained in Example 4.

Fe(II)-substituted beta type zeolites were obtained in the same manner as in Example 1, except that $Fe(II)SO_4 \cdot 7H_2O$ was added in an amount of 5% by mass (Example 2), 10% by mass (Example 3), and 20% by mass (Examples 4) based on the beta type zeolite before substitution. The amount of $Fe^{2+}$ supported was as shown in Table 1. Moreover, FIGS. 4 to 6 show X-ray diffraction diagrams of the obtained Fe(II)-substituted beta type zeolites. The obtained Fe(II)-substituted beta type zeolites were evaluated in the same manner as in Example 1. The results are shown in Table 1.

Comparative Example 1

Figure 7:
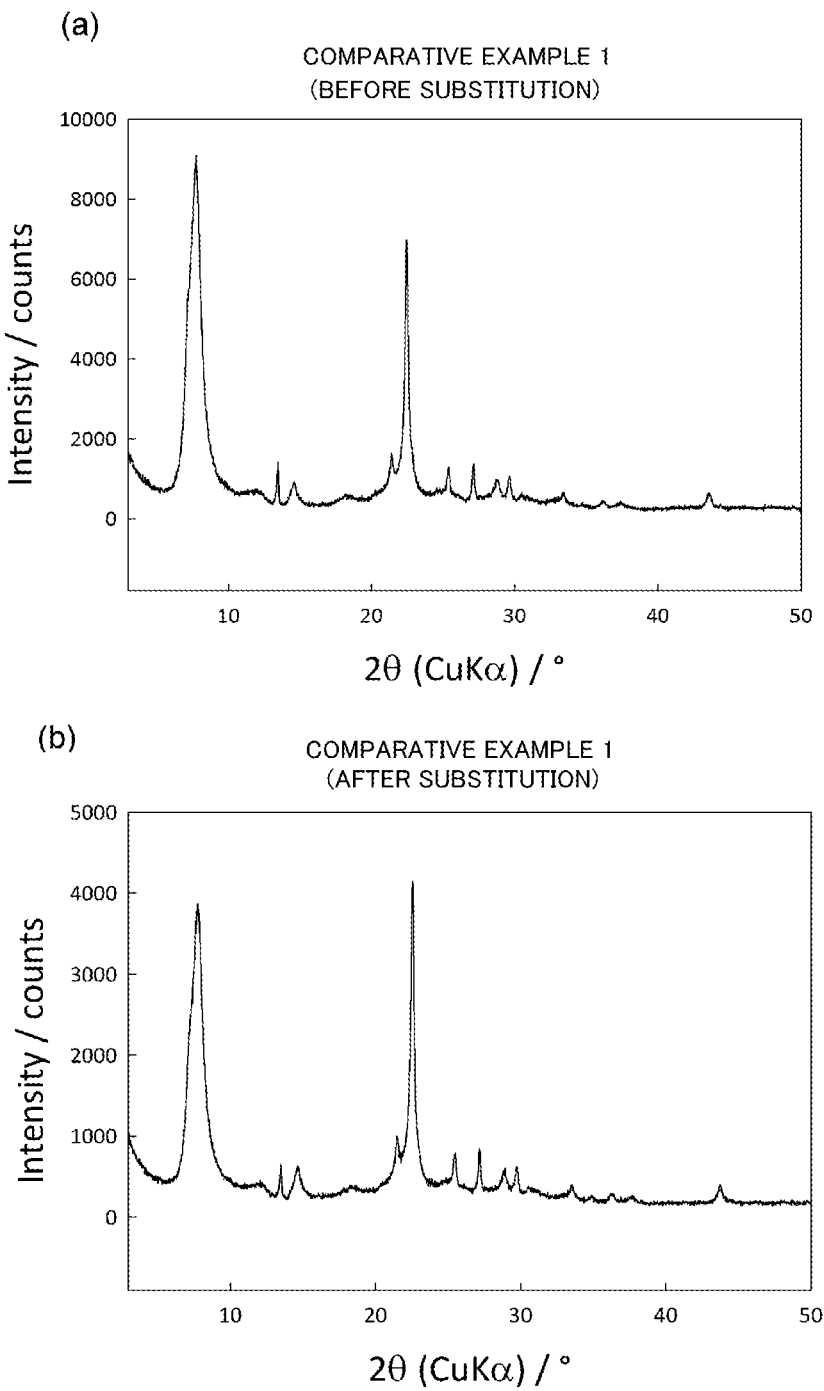
FIG. 7 (a) is an X-ray diffraction diagram of a beta type zeolite before substitution used in Comparative example 1.

An Fe(II)-substituted beta type zeolite was obtained in the same manner as in Example 1, except that an H$^+$-type beta type zeolite (model number: HSZ-940HOA, synthesized using SDA) manufactured by Tosoh Corporation was used as a beta type zeolite before substitution. The X-ray diffraction diagram of the zeolite is shown in FIG. 7(a). The X-ray diffraction diagram of the obtained Fe(II)-substituted beta type zeolite is shown in FIG. 7(b). The obtained Fe(II)-substituted beta type zeolite was evaluated in the same manner as in Example 1, in terms of the adsorption of nitrogen monoxide gas and toluene gas. The results are shown in Table 1.

Comparative Example 2

Figure 8:
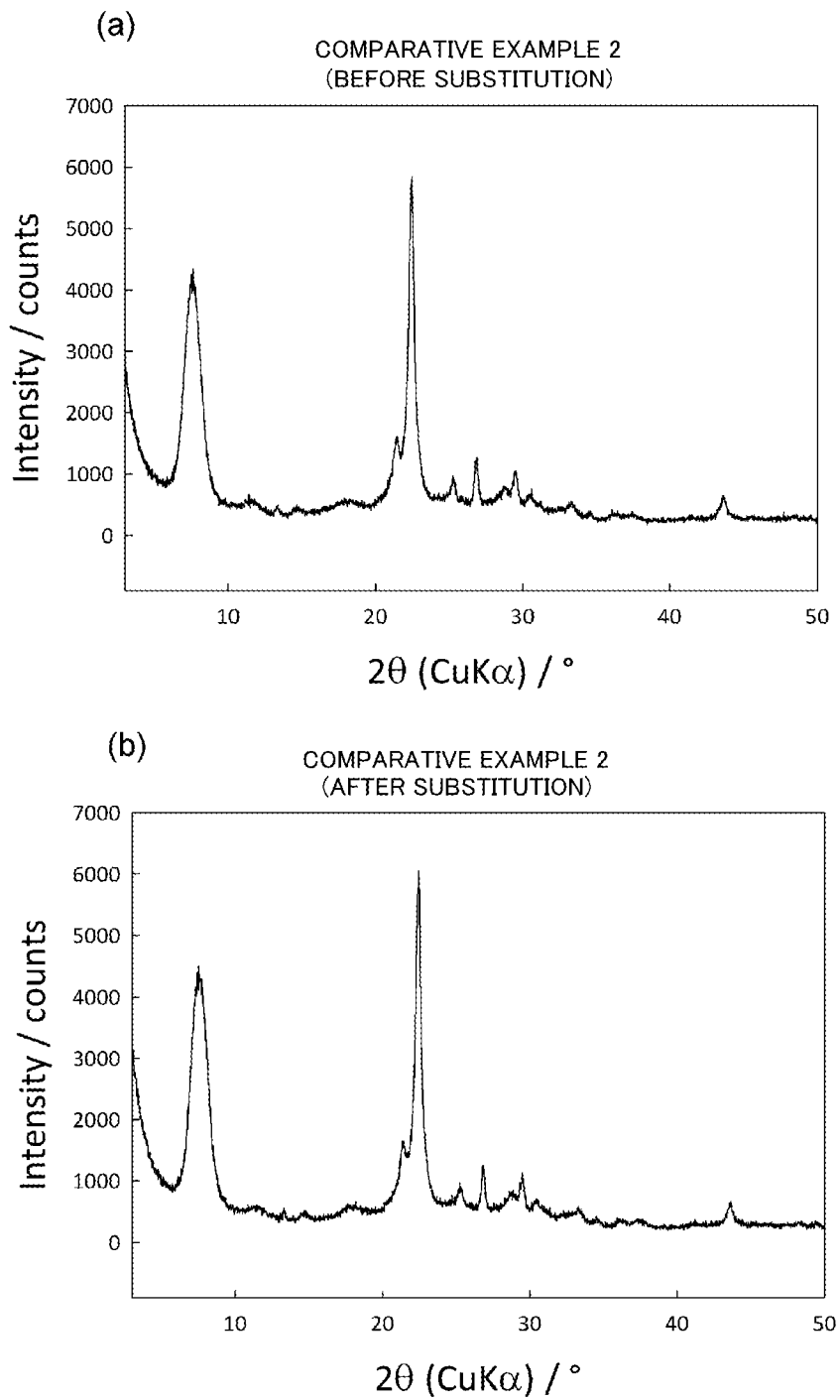
FIG. 8(a) is an X-ray diffraction diagram of a beta type zeolite before substitution used in Comparative example 2.
FIG. 8(b) is an X-ray diffraction diagram of an Fe(II) beta type zeolite used in Comparative example 2.

An Fe(II)-substituted beta type zeolite was obtained in the same manner as in Example 1, except that an NH$_4^+$-type beta type zeolite (model number: HSZ-930NHA, synthesized using SDA) manufactured by Tosoh Corporation was used as a beta type zeolite before substitution. The X-ray diffraction diagram of the zeolite is shown in FIG. 8(a). The X-ray diffraction diagram of the obtained Fe(II)-substituted beta type zeolite is shown in FIG. 8(b). The obtained Fe(II)-substituted beta type zeolite was evaluated in the same manner as in Example 1, in terms of the adsorption of nitrogen monoxide gas and toluene gas. The results are shown in Table 1.

TABLE 1

| | Beta type zeolite before substitution | | | | Fe(II)-substituted beta type zeolite | | | | | |
|---|---|---|---|---|---|---|---|---|---|---|
| | SiO$_2$/Al$_2$O$_3$ | BET specific surface area (m$^2$/g) | Micropore specific surface area (m$^2$/g) | Micropore volume (cm$^3$/g) | SiO$_2$/Al$_2$O$_3$ | BET specific surface area (m$^2$/g) | Micropore specific surface area (m$^2$/g) | Micropore volume (cm$^3$/g) | Amount of Fe(II) supported (% by mass) | Amount of NO adsorbed (cm$^3$/g) | Amount of toluene adsorbed (cm$^3$/g) |
| Example 1 | 11.0 | 520 | 439 | 0.231 | 11.2 | 502 | 420 | 0.221 | 0.20 | 0.52 | 0.063 |
| Example 2 | 11.0 | 520 | 439 | 0.231 | 11.6 | 479 | 364 | 0.192 | 1.10 | 2.98 | 0.109 |
| Example 3 | 11.0 | 520 | 439 | 0.231 | 11.2 | 440 | 343 | 0.181 | 2.00 | 3.60 | 0.065 |
| Example 4 | 11.0 | 520 | 439 | 0.231 | 11.6 | 459 | 310 | 0.162 | 3.40 | 8.80 | 0.073 |
| Comparative example 1 | 39.6 | 590 | 320 | 0.168 | 41.4 | 530 | 285 | 0.149 | 0.14 | 0.10 | 0.059 |
| Comparative example 2 | 27.0 | 617 | 293 | 0.154 | 30.2 | 558 | 279 | 0.146 | 0.05 | 0.00 | 0.045 |

From the results shown in Table 1, it is clearly understood that if the Fe(II)-substituted beta type zeolite obtained in each example is used, nitrogen monoxide gas and toluene gas can be more efficiently adsorbed and removed, compared to a case of using the Fe(II)-substituted beta type zeolite obtained in each comparative example. It is also understood that nitrogen monoxide gas and toluene gas can be efficiently adsorbed and removed at room temperature.

Particularly, through the comparison among Examples 1 to 4, it is clearly understood that as the amount of Fe(II) supported increases, the amount of nitrogen monoxide and toluene gas adsorbed increases.

The invention claimed is:

1. An Fe(II)-substituted beta type zeolite which has been ion-exchanged with Fe(II) ions,
   wherein a ratio of SiO$_2$/Al$_2$O$_3$ is 10 to 18, a BET specific surface area is 400 m$^2$/g to 700 m$^2$/g, a micropore specific surface area is 290 m$^2$/g to 500 m$^2$/g, and a micropore volume is 0.15 cm$^3$/g to 0.25 cm$^3$/g.

2. The Fe(II)-substituted beta type zeolite according to claim 1,
   wherein the amount of Fe(II) supported is 0.01% by mass to 6.5% by mass based on the Fe(II)-substituted beta type zeolite.

3. The Fe(II)-substituted beta type zeolite according to claim 1 that uses, as a beta type zeolite which has not yet been ion-exchanged with Fe(II) ions, a beta type zeolite in which a ratio of SiO$_2$/Al$_2$O$_3$ is 10 to 16, a BET specific surface area that is measured in a state of a sodium-type is 500 m$^2$/g to 700 m$^2$/g, a micropore specific surface area is 350 m$^2$/g to 500 m$^2$/g, and a micropore volume is 0.15 cm$^3$/g to 0.25 cm$^3$/g.

4. The Fe(II)-substituted beta type zeolite according to claim 3 that uses, as a beta type zeolite of which has not yet been ion-exchanged with Fe(II) ions, a beta type zeolite which is obtained by
   (1) mixing a silica source, an alumina source, and an alkali source with water to obtain a reaction mixture having a composition represented by the following molar ratio,
   SiO$_2$/Al$_2$O$_3$=40 to 200
   Na$_2$O/SiO$_2$=0.22 to 0.4
   H$_2$O/SiO$_2$=10 to 50
   (2) using, as a seed crystal, a beta type zeolite which has a ratio of SiO$_2$/Al$_2$O$_3$ of 8 to 30 and does not contain an organic compound having an average particle size of 150 nm or larger, and adding the seed crystal to the reaction mixture in a proportion of 0.1% by mass to 20% by mass based on a silica component in the reaction mixture, and
   (3) heating the reaction mixture, to which the seed crystal has been added, at 100° C. to 200° C. in a sealed state.

5. A gas adsorbent containing the Fe(II)-substituted beta type zeolite according to claim 1.

6. The gas adsorbent according to claim 5 that is used for adsorbing nitrogen monoxide.

7. The gas adsorbent according to claim 5 that is used for adsorbing hydrocarbon.

8. A method for producing an Fe(II)-substituted beta type zeolite, comprising:
   a step of causing Fe(II) ions to be supported on a beta type zeolite by dispersing the beta type zeolite, in which a ratio of SiO$_2$/Al$_2$O$_3$ is 10 to 16, a BET specific surface area that is measured in a state of sodium type is 500 m$^2$/g to 700 m$^2$/g, a micropore specific surface area is 350 m$^2$/g to 500 m$^2$/g, and a micropore volume is 0.15 cm$^3$/g, to 0.25 cm$^3$/g, in an aqueous solution of a water-soluble divalent iron compound, and performing mixing under stirring.

9. The production method according to claim 8,
wherein during the mixing under stirring, ascorbic acid of a mole number that is 0.1 to 3 times greater than that of the divalent iron is added to the aqueous solution.

10. A method for removing nitrogen monoxide and/or hydrocarbon, comprising:
causing the nitrogen monoxide to be adsorbed and/or the hydrocarbon to be adsorbed onto an Fe(II)-substituted beta type zeolite by bringing the nitrogen monoxide or nitrogen monoxide-containing gas and/or the hydrocarbon or hydrocarbon-containing gas into contact with the Fe(II)-substituted beta type zeolite which has been ion-exchanged with Fe(II) ions and in which a ratio of $SiO_2/Al_2O_3$ is 10 to 18, a BET specific surface area is 400 $m^2/g$ to 700 $m^2/g$, a micropore specific surface area is 290 $m^2/g$ to 500 $m^2/g$, and a micropore volume is 0.15 $cm^3/g$ to 0.25 $cm^3/g$.

* * * * *